May 11, 1965     R. J. FLAHERTY, JR., ETAL     3,183,384
IMMERSIBLE DYNAMOELECTRIC DEVICE
Filed Sept. 24, 1962

INVENTORS
ROBERT J. FLAHERTY, JR.
BY   WATT V. SMITH

*Donald Kaul*

AGENT.-

3,183,384
IMMERSIBLE DYNAMOELECTRIC DEVICE
Robert J. Flaherty, Jr., Annapolis, Md. (632 Binsted Road, Glen Burnie, Md.) and Watt V. Smith, Annapolis, Md. (315 Old County Road, Severna Park, Md.)
Filed Sept. 24, 1962, Ser. No. 225,943
5 Claims. (Cl. 310—90)
(Granted under Title 35, U.S. Code (1952), sec. 266)

The invention described herein may be manufactured and used by or for the Government of the United States of America for governmental purposes without the payment of any royalties thereon or therefor.

This invention relates generally to dynamoelectric devices; and more particularly relates to a dynamoelectric machine operable immersed in a gas or liquid; and more specifically relates to an immersible dynamoelectric device having a stator element and a rotor element rotatable relative to one another but having no shaft-bearings for supporting the rotor element but instead supporting the rotor on a hydrodynamic film between the rotor and stator.

In general, shaft-type electric motor devices require separate axially-spaced bearings which support the shaft. The bearings create problems such as cleaning, lubricating, replacement and the like. Recently, an electric motor device has been disclosed which dispenses with such bearings and employs a hydrodynamically supported rotor member. An example of such a device is disclosed in United States Patent No. 2,983,832 to E. F. Macks. Devices of this type are intended to operate in a gaseous ambient atmosphere but are not suitable for use in a liquid ambient atmosphere.

It is an object of this invention to provide a rotary dynamoelectric device capable of operating with a gaseous or liquid medium including sea water, in contact with the elecrical parts of the device.

A further object of the invention is to provide a rotary dynamoelectric machine in which the rotary elements are separated or positioned by a hydrodynamic film composed of the ambient liquid or gas in contact with the elements. Preferably, the film is automatically produced by force directed flow resulting from the operation and construction of the machine.

Another object of this invention is to provide a dynamoelectric device of the type containing a stator and rotor and in which both the stator and rotor may be formed as shaftless hollow cylindrical bodies, and so constructed or arranged that their relative rotation while immersed in a fluid will cause such fluid to flow past the internal and external walls of each cylindrical body, thereby cooling the same and thus permitting the device to operate with higher electrical currents.

A further object of this invention is to provide a submersible dynamoelectric device capable of operation while submerged in a fluid whereby said fluid reduces the heat and noise generated by operation of the device.

Still a further object of this invention is to provide an electric motor having a rotor and stator in which the mating motor and stator surfaces can act as positioning and supporting elements for each other, thus eliminating the need for separate bearing elements, and thereby reducing the weight and volume of the motor, and thus also eliminating the need for a shaft which previously was used to transmit positioning forces between separate bearing elements and the rotor.

Other objects, advantages and salient features of the present invention will become apparent from the following description, taken in connection with the annexed drawings, which illustrate a preferred embodiment, in which.

Figure 1:
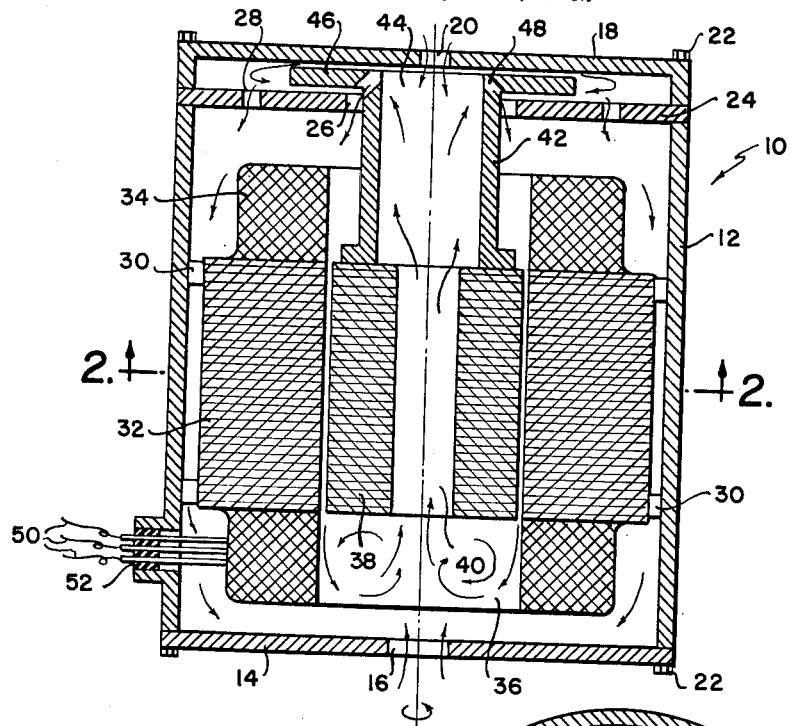
FIG. 1 is a longitudinal sectional view of a dynamoelectric device or machine in accordance with the present invention.
Figure 2:
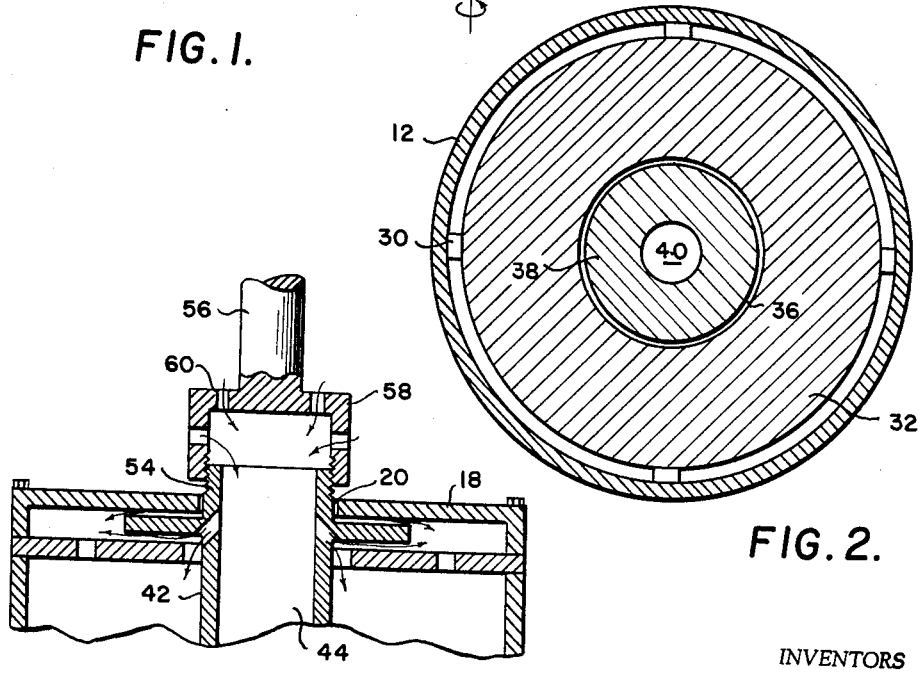
FIG. 2 is a transverse sectional view of the device of FIG. 1 taken along the line 2—2.

Referring now to the drawings, FIG. 1 shows a preferred embodiment of a dynamoelectric device 10 in accordance with the present invention, preferably an induction motor, in which a casing means 12 which houses the motor elements is provided at one end with a flat end cover 14 having a central aperture 16 and at its other end with a generally cup-shaped end cover 18 having a central aperture 20. The end covers 14 and 18 are secured to the casing means 12 by a plurality of bolts 22, or any other suitable form of fastening means.

The casing means and end plates can be formed of any suitable material that preferably is non-corrosive or compatible with the medium in which they are to be immersed. A model has been constructed making these elements of Lucite which proved to be highly satisfactory not only for its noncorrosiveness but also for its transparency which allowed visual examination of the interior motor elements in operation.

For a vertically disposed machine as shown, a thrust bearing element 24 of glass-reinforced plastic or other suitable material may be mounted between the casing 12 and the end plate 18. The bearing element 24 is provided with holes which align with similar holes in the casing 12 and end cover 18 so that the bolts 22 can pass through the thrust bearing 24 and screw into the casing 12. The thrust bearing 24 is provided with a large central aperture 26 and a plurality of smaller apertures 28 circularly arranged at spaced intervals at a radial location between the central aperture 26 and the outer periphery of the thrust bearing.

Although it is not needed in general operation, it may prove advantageous in certain applications to pivotally mount the thrust bearing 24 to prevent misalignment of the bearing. There are several satisfactory methods of accomplishing this pivotal mounting, one of which is to reduce the outside diameter of the thrust bearing 24 so it is less than the inside diameter of the casing 12, and then providing a pair of pins on the interior of the casing wall 12 mating with a pair of holes in the outside edge of the thrust bearing 24, so that the bearing is mounted in a conventional gimbal mounting.

The stator conforms generally to the shape of the casing 12, and it is fixedly attached thereto by means of segmental spacers 30 which space the stator slightly away from the interior walls of the casing 12 to provide cooling passages or spaces. The stator itself is comprised of a laminated core structure 32 and field windings 34, both of conventional electric motor type construction, preferably three phase. A central hole or bore 36 extends through the stator substantially parallel to the central axis of the casing 12 which defines the axis of rotation of the device. A cylindrical rotor 38 of the conventional laminated induction type, preferably with embedded conductors, is freely mounted within the stator bore 36. The rotor 38 also has a central bore 40 extending therethrough and both the rotor and its bore and the stator and its bore are substantially parallel, concentric and coaxial along the axis of rotation. The rotor and stator define the complemental working parts of the device and the stator bore walls and the rotor outer surface define mating and coacting substantially smooth continuous surfaces.

A cylindrical thrust runner 42 having a central bore 44 is affixed to the thrust bearing end of the rotor 38 by some suitable fastening means, such as bolts, welding or the like. The thrust runner 42 is provided with an end flange 46 which is located between the thrust bearing 24 and the end plate 18 and which thereby acts as a thrust shoe. A plurality of flow passages 48 are provided in the thrust runner 42 in the region of the end flange 46 to allow outflow from the thrust runner bore 44.

Conductors 50 extending through a substantially fluid-tight stopper 52 are provided for connecting an alternating current source to the stator field windings 34 for the purpose of energizing them. In operation, energization of the stator windings 34 creates a rotating magnetic field in the laminations 32 which in turn causes rotation of the rotor 38 by means of induced current, in a manner well-known in conventional induction motors. Since the thrust runner 42 is affixed to the rotor 38, it also rotates when the motor is energized.

The outside diameter of the rotor 38 is very slightly smaller than the inside diameter of the stator bore 36, thus providing a very narrow annular space between the rotor and the stator. When the rotor is rotated as described above, a hydrodynamic load supporting film is created in the annular space to radially support the rotor and render it completely out of contact with the stator as they rotate relative to one another. This film is well-known in the journal bearing art and its creation and properties are generally known as the hydrodynamic theory of lubrication, a theory well-documented in all standard bearing texts. Another hydrodynamic film is created between the thrust shoe 46 and the thrust bearing 24 to support axially the rotor 38.

Rotation of the rotor 38 starts the fluid adjacent the rotor and thrust runner 42 rotating at a certain angular velocity, the speed of which depends upon the speed of rotor rotation and the radial distance of the fluid from the axis of rotation of the rotor. As the rotor rotates, thus causing a corresponding rotation of the adjacent fluid mass, a pressure change occurs which causes movement of the fluid and resultant flow.

Flow arrows have been provided on FIG. 1 to show the approximate flow path of the fluid. Fluid enters the device 10 through the aperture 16 in the end plate 14. It is believed that in the cavity between the rotor end and the end plate 14, a turbulent flow occurs, this turbulence being created by a pressure differential caused by rotor rotation and by the escaping rotor hydrodynamic film. This turbulence tends to flow the fluid into the rotor bore 40 and thrust runner bore 44, from where, along with the fluid initially in these bores, it flows outward through the flow passage 48. Part of the fluid flowing through the passages 48 provides the hydrodynamic film between the thrust bearing 24 and the rotating thrust shoe 46, and a part of the fluid flows through the thrust bearing central aperture 26 and from there to the annular space between the stator bore 36 and the rotor outer surface of rotor 38 wherein the relative rotation of the parts creates a hydrodynamic film which radially supports the rotor 38. When the thrust bearing hydrodynamic film dissipates by passing beyond the lateral extent of the thrust shoe 46, it flows through the holes 28 in the thrust bearing. Additional flow through the holes 28 is provided by fluid which enters through the end plate aperture 20 and passes between the thrust shoe 46 and the end plate 18. This combined fluid stream which flows through the holes 28 either provides additional fluid for the hydrodynamic rotor film or flows between the stator and the casing 12, or both, thereby cooling the stator. It is, of course, understood that the fluid flow through the rotor bore and the hydrodynamic film between the rotor and the stator act also as heat dissipating means to cool the respective parts.

The device as illustrated in FIG. 1 is provided with apertures 16 and 20 at opposite ends to provide entrance means for the working fluid. If, as an example, it is assumed that the device is to be used to drive a pump which is to pump sea water, gasoline or the like, the device can be dropped right into the fluid to be pumped along with the pump itself and this fluid will flow through the device to cool it and provide the hydrodynamic supporting film. When, as is illustrated, the device is provided with end apertures 16 and 20, it operates as an open system with fluid both entering and leaving through these apertures to provide a fluid flow through the device which dissipates the heat produced in the system. However, the device can also be operated as a closed system, if desired, by sealing the end apertures 16 and 20 and leaving the interior of the casing full of fluid. Such operation, however, is performed by sacrificing the heat exchange advantage of flowing through the device. For operation while submerged in liquids as well as in gases, the stator and rotor elements are encapsulated in epoxy resin or other similar material to render them impervious and inert to the deleterious effects of the surrounding liquid. The stator element and the rotor element are embedded separately after which the stator bore and rotor outer surface are properly machined and polished to provide a clearance therebetween equivalent to that normally utilized in a normal journal bearing, which is 0.001 inch of clearance per inch of rotor diameter. A model of the motor has been operated for long periods of time in sea water without suffering any adverse effects.

In a specific embodiment of a dynamoelectric device in accordance with the present invention, but to which the invention is not limited, the encapsulating resin used was thermosetting Epoxylite No. 293–12, a thermal shock resistant potting resin made by Epoxylite Corporation of El Monte, California. The epoxy is a two part compound mixed at a 1:1 ratio by weight or volume. Four pounds of each part of the epoxy were separately heated to 65° for three hours, then mixed for 10 minutes. The two parts of the epoxy were then mixed together and stirred for 10 minutes by an electric mixer. The stator core 32 was cleaned and sand blasted and the bore 36 was machined approximately 0.005 inch to remove manufacturing variations. The rotor 38 was bored to provide the central bore 40 of approximately 1.5 inches diameter. The stator core 30 and rotor 38 were then heated for approximately 18 hours in a 190° C. oven, then dipped into the aforementioned epoxy compound and cured in a 175° C. oven. The process was repeated until the stator core 30 obtained a 0.030 inch epoxy coating and the rotor 38 obtained a 0.025 inch coating. The exterior of the rotor was machined to an average diameter of 4.727 inches and the stator bore 36 was bored to provide approximately 0.005 inch clearance between the stator and rotor.

The stator windings 34 were encapsulated in a two part mold assembly. The mold assembly was coated with DC–20, a Dow Corning mold release compound, and the windings 34 were inserted in the mold. The windings and mold assembly were heated overnight in a 93° C. oven and were then mounted on a 60 cycle vibrating table. The above-described epoxy compound was heated to 150° F. and poured into the mold while the mold and windings were being vibrated by the vibrating table. After the pouring was completed, the windings and mold assembly continued to be vibrated for 45 minutes to remove entrapped air. After vibrating, the windings and mold assembly were placed in a 93° C. oven for 12 hours to cure the epoxy. The bore in the windings was then bored to give an average of 7 mils (0.007 in. clearance).

Figure 3:
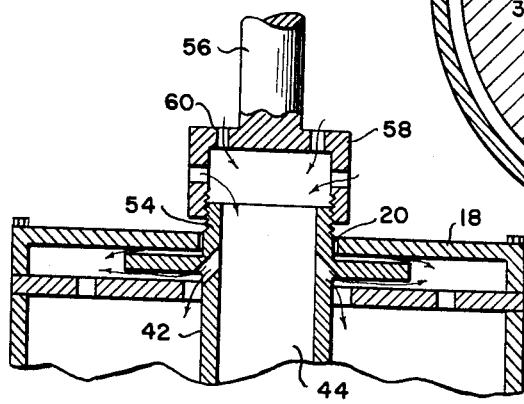
FIG. 3 is a partial sectional view of a modification of the device of FIG. 1 wherein the device is shown driving a shaft to utilize the output of the device.

The dynamoelectric device of the present invention can be used in any suitable manner as a power source to drive other equipment. FIG. 3 shows an example of how the device 10 can be adapted to rotate a shaft. The upper end of the thrust runner 32 is provided with a threaded extension portion 54 which extends through the central aperture 20 in the end plate 18. The aperture 20 is of sufficiently greater diameter than the extension portion 54 so that an annular space surrounds the portion 54 where it passes through the end plate. The shaft 56 having an enlarged threaded cylindrical end portion 58 is threaded onto the thrust runner extension 54. The cylindrical end portion 58 is provided with a plurality of apertures 60 which permit fluid flow into the central bore 44 of the thrust runner, as is indicated by the flow arrows. Additional fluid flow occurs through the annular space provided by the aperture 20, so that as the thrust runner 42 rotates the shaft 56, fluid flow occurs in exactly the same manner as indicated in FIG. 1. It should be understood that the arrangement of FIG. 3 is only exemplary of a drive arrangement and any other suitable drive arrangement can be employed without departing from the scope of the invention.

The dynamoelectric device 10 described herein is particularly adapted for operation with a vertical axis of rotation such as is shown in FIG. 1. However, the device will also operate with a horizontal axis of rotation or with the axis of rotation in any skew position. When the device is operated in a horizontal position, the induced field between the stator and rotor is sufficient to keep the rotor axially positioned while device is running. When the field is deactivated, the thrust bearing and thrust runner function to limit axial shifting of the rotor.

As an added feature of the invention, it was found by operating models built in accordance with the principles of the invention that the device operated extremely quietly. It is believed that this silent operation can be attributed to lack of contact between the moving parts and thus no appreciable friction, and also to the fact that the encapsulation process reduces vibration of the laminations.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A dynamoelectric device capable of operation while immersed in an ambient fluid, said device comprising:
   a hollow casing element having at least one aperture therein for admitting ambient fluid into and out of said casing;
   a thrust bearing means mounted within said casing adjacent one end thereof;
   a stator element affixed to said casing element and having a smooth cylindrical bore extending therethrough;
   a cylindrical rotor element having a smooth outer surface located within said stator cylindrical bore and having a smaller diameter than said stator cylindrical bore and thus defining a spaced region between said stator and rotor; said rotor element also having a cylindrical bore
   a thrust runner affixed at one end to the thrust bearing end of the rotor and rotatable therewith, said thrust runner being provided at its other end with a thrust shoe means in spaced cooperative relation with said thrust bearing means and having an opening coaxial with said cylindrical bore of said rotor; and
   power supply means for producing a magnetic field in said stator element which in turn causes rotation of said rotor element and its affixed thrust runner about an axis of rotation;
   said rotation creating a hydrodynamic fluid film in the spaced region between said stator and rotor and a hydrodynamic film in the spaced region between said thrust bearing means and thrust shoe means, said films being comprised exclusively of ambient fluid;
   said hydrodynamic film between said stator and rotor providing the total support for said rotor element radially of said axis of rotation and said thrust bearing hydrodynamic film providing the total support for said rotor element axially of said axis of rotation.

2. A device as defined in claim 1 wherein said spaced region between said rotor and stator has a radial dimension of approximately 0.001 inch per inch of rotor diameter.

3. A device as defined in claim 1 wherein said rotor and stator elements are encapsulated in plastic to permit operation in both liquid and gaseous ambient fluid.

4. A dynamoelectric device capable of operating while immersed in an ambient fluid, said device comprising:
   a hollow casing element having at least one aperture therein for admitting ambient fluid into and out of said casing;
   a thrust bearing means mounted within said casing adjacent one end thereof;
   a stator element affixed to said casing element and having a smooth cylindrical bore extending therethrough;
   a cylindrical rotor element having a smooth outer surface located within said stator cylindrical bore and having a smaller diameter than said stator cylindrical bore and thus defining a spaced region between said stator and rotor, said rotor element also having a cylindrical bore;
   a thrust runner affixed at one end to the thrust bearing end of the rotor and rotatable therewith, said thrust runner being provided at its other end with a thrust shoe means in spaced cooperative relation with said thrust bearing means and having an opening coaxial with said cylindrical bore of said rotor;
   power supply means for producing a magnetic field in said stator element which in turn causes rotation of said rotor element and its affixed thrust runner about an axis of rotation;
   said rotation creating a hydrodynamic fluid film in the spaced region between said stator and rotor and a hydrodynamic film in the spaced region between said thrust bearing means and thrust shoe means, said films being comprised exclusively of ambient fluid;
   said thrust runner being provided with at least one flow passage connecting said thrust runner bore with the exterior of said thrust runner whereby when said rotor and thrust runner are rotated, ambient fluid flows through their respective bores and out through said flow passage to provide fluid to produce said hydrodynamic supporting films;
   said hydrodynamic film between said stator and rotor providing the total support for said rotor element radially of said axis of rotation and said thrust bearing hydrodynamic film providing the total support for said rotor element axially of said axis of rotation.

5. A dynamoelectric device capable of operation while immersed in an ambient fluid, said device comprising:
   a hollow casing element having at least one aperture therein for admitting ambient fluid into and out of said casing;
   a thrust bearing means mounted within said casing adjacent one end thereof;
   a stator element affixed to said casing element and having a smooth cylindrical bore extending therethrough;
   a cylindrical rotor element having a smooth outer surface located within said stator cylindrical bore and having a smaller diameter than said stator cylindrical bore and thus defining a spaced region between said stator and rotor, said rotor element also having a cylindrical bore;
   a thrust runner affixed at one end to the thrust bearing end of the rotor and rotatable therewith, said thrust runner being provided at its other end with a thrust shoe means in spaced cooperative relation with said thrust bearing means and having an opening coaxial with said cylindrical bore of said rotor;
   power supply means for producing a magnetic field in said stator element which in turn causes rotation of said rotor element and its affixed thrust runner about an axis of rotation;

said rotor creating a hydrodynamic fluid film in the spaced region between said stator and rotor and a hydrodynamic film in the spaced region between said thrust bearing means and thrust shoe means, said films being comprised exclusively of ambient fluid;

said thrust bearing means being located between said thrust shoe means and said rotor and stator elements and being provided with at least one aperture located at a radial distance beyond the lateral extent of said thrust shoe means whereby when said thrust bearing hydrodynamic film dissipates by passing beyond the lateral extent of said thrust shoe means, the fluid from said film flows through said thrust bearing means aperture;

said hyrodynamic film between said stator and rotor providing the total support for said rotor element radially of said axis of rotation and said thrust bearing hydrodynamic film providing the total support for said rotor element axially of said axis of rotation.

References Cited by the Examiner
UNITED STATES PATENTS

| | | | |
|---|---|---|---|
| 2,889,474 | 6/59 | Macks | 310—90 |
| 2,928,960 | 3/60 | Macks | 310—90 |
| 2,937,294 | 5/60 | Macks | 310—90 |
| 2,983,832 | 5/61 | Macks | 310—90 |
| 3,121,179 | 2/64 | Macks | 310—90 |
| 3,134,037 | 5/64 | Upton | 310—90 |

MILTON O. HIRSHFIELD, *Primary Examiner.*